(12) United States Patent
Sehlin et al.

(10) Patent No.: US 6,905,581 B2
(45) Date of Patent: Jun. 14, 2005

(54) OXYGEN PERMEABLE ELECTRODE SYSTEM

(75) Inventors: Scott R. Sehlin, Bettendorf, IA (US); Courtney J. Monzyk, Davenport, IA (US)

(73) Assignee: Carleton Life Support Systems, Inc., Orchard Park, NY (US)

( * ) Notice: Subject to any disclaimer, the term of this patent is extended or adjusted under 35 U.S.C. 154(b) by 241 days.

(21) Appl. No.: 10/065,943

(22) Filed: Dec. 2, 2002

(65) Prior Publication Data

US 2004/0084303 A1 May 6, 2004

Related U.S. Application Data

(60) Provisional application No. 60/319,661, filed on Oct. 31, 2002.

(51) Int. Cl.[7] .............................. C25B 9/00; H01M 4/86
(52) U.S. Cl. ............. 204/279; 204/290.12; 204/290.14; 429/40; 429/44
(58) Field of Search ............................ 204/279, 290.12, 204/290.14, 266, 278; 205/630, 632, 636, 343; 429/40, 44

(56) References Cited

U.S. PATENT DOCUMENTS

| | | | |
|---|---|---|---|
| 4,940,528 A | 7/1990 | Oki et al. ................... 204/427 |
| 5,118,317 A | * 6/1992 | Wijnen ......................... 445/50 |
| 5,378,345 A | 1/1995 | Taylor et al. ................ 204/421 |
| 5,855,762 A | 1/1999 | Phillips et al. .............. 205/634 |
| 5,871,624 A | 2/1999 | Crome .................... 204/286.1 |
| 5,972,182 A | 10/1999 | Lawless ...................... 204/258 |
| 5,985,113 A | 11/1999 | Crome et al. ................ 205/343 |
| 6,194,335 B1 | 2/2001 | Crome et al. ................ 501/103 |
| 6,203,676 B1 | 3/2001 | Phillips et al. .............. 204/256 |
| 6,290,757 B1 | 9/2001 | Lawless ......................... 96/19 |
| 6,352,624 B1 | 3/2002 | Crome et al. ................ 204/277 |
| 6,382,958 B1 | 5/2002 | Bool, III et al. ................ 431/2 |

* cited by examiner

*Primary Examiner*—Bruce F. Bell
(74) *Attorney, Agent, or Firm*—Marsteller & Associates, P.C.

(57) ABSTRACT

An electrochemical device (18) for generating a desired gas of the type includes an ionically conductive electrolyte layer (20), a porous electrode layer (22), and a current collector layer (16) that has a high electrical conductivity and is porous to a desired gas (24) generated by the electrochemical device (18). The current collector layer (16) is substantially formed as a film comprised of a layer of spherical refractory material objects (26) having a conductive coating (12) of a precious metal. The coated spherical objects (26) have a desired diameter (28) making them suitable for forming into the film.

8 Claims, 2 Drawing Sheets

OXYGEN PERMEABLE ELECTRODE SYSTEM

CROSS REFERENCE TO RELATED APPLICATIONS

This application claims the benefit of U.S. Provisional Application Ser. No. 60/319,661, filed Oct. 31, 2002, entitled OXYGEN PERMEABLE ELECTRODE SYSTEM.

BACKGROUND OF INVENTION

1. Technical Field

The invention relates to the field of electrochemical gas generators, and more particularly for an electrode composition and method for forming electrodes for ceramic oxygen generating systems (COGS).

2. Background Art

Electrochemical devices, such as fuel cells, oxygen sensors, and oxygen separation membranes are becoming increasingly popular as candidates for a variety of applications. Elevated operating temperatures required for efficient operation of these devices pose a major challenge for achieving required cost, power efficiency, and device longevity for prospective markets.

Common failure modes of the electrodes or current collectors in oxygen separation membrane systems include:

a. Densification of porous electrode and current collector coatings during operation;

b. Chemical attack of coatings by atmospheric contaminants; and, c. Delamination of coatings from each other and from the substrate.

Typical current collectors which operate in an oxidizing atmosphere at temperatures exceeding 600° C. include Silver (Ag), Gold (Au), Platinum (Pt), Palladium (Pd), and alloys of these constituents. Although the combination of high electrical conductivity and low cost makes Silver (Ag) an attractive material, its tendency to sinter and vaporize under typical operating temperatures limits the applicability of the material in its pure form. Silver is also vulnerable to chemical attack in some conditions that might be encountered in the case of chemical warfare or other contaminated environments, as well as oxidation when in contact with high pressure, high purity oxygen. Inclusion of other precious metals, and their alloys, lead to a dramatic reduction in conductivity and increase in cost.

Examples of such known electrodes used with electrochemical gas generating systems are disclosed in U.S. Pat. No. 5,378,345, issued Jan. 3, 1995; U.S. Pat. No. 5,985,113, issued Nov. 16, 1999; U.S. Pat. No. 5,972,182, issued Oct. 26, 1999; U.S. Pat. No. 6,194,335, issued Feb. 27, 2001; U.S. Pat. No. 6,203,676, issued Mar. 20, 2001; and U.S. Pat. No. 6,290,757, issued Sep. 18, 2001.

Delamination between precious metal coatings and other coatings or substrates is common due to the relatively higher thermal expansion of the metal coating versus the other materials, typically ceramic, used in electrochemical devices.

The present invention includes an electrode and current collector system that is resistant to the aforementioned failure modes, while minimizing the use of precious metals, thereby enhancing overall electrochemical system performance and reducing cost as compared to traditional or known approaches.

While the above cited references introduce and disclose a number of noteworthy advances and technological improvements within the art, none completely fulfills the specific objectives achieved by this invention.

SUMMARY OF INVENTION

In accordance with the present invention, a current collector for an electrochemical device of the type that includes an ionically conductive electrolyte layer for gas generating includes the current collector layer having a high electrical conductivity and being porous to desired gas generated by the electrochemical device. The current collector layer is substantially formed as a film comprised of a layer of spherical refractory material objects having a conductive coating of a precious metal. The coated spherical objects have a desired diameter making them suitable for forming into the electrically conductive film.

These and other objects, advantages and features of this invention will be apparent from the following description taken with reference to the accompanying drawings, wherein is shown the preferred embodiments of the invention.

BRIEF DESCRIPTION OF DRAWINGS

A more particular description of the invention briefly summarized above is available from the exemplary embodiments illustrated in the drawing and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

DETAILED DESCRIPTION

So that the manner in which the above recited features, advantages, and objects of the present invention are attained can be understood in detail, more particular description of the invention, briefly summarized above, may be had by reference to the embodiment thereof that is illustrated in the appended drawings. In all the drawings, identical numbers represent the same elements.

Figure 1:
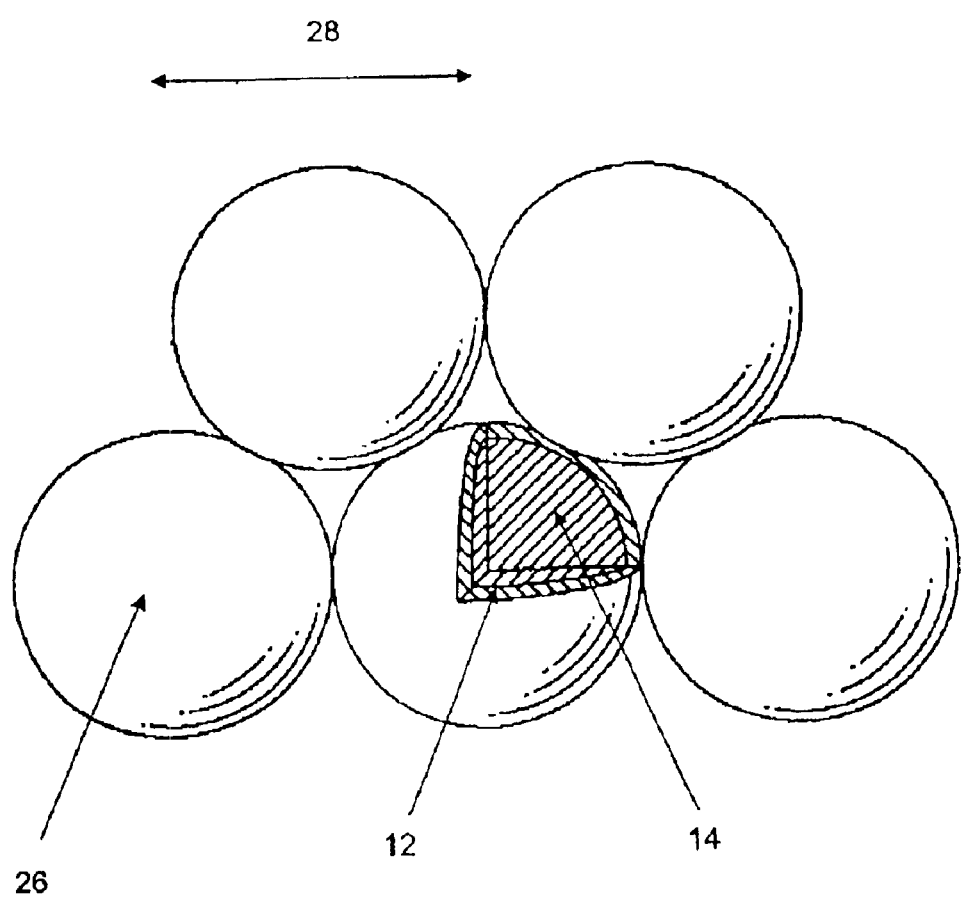
FIG. 1 is an illustration of a cross section of a current collector composed of conductive coating applied to refractory particles.

The current collector 16 of the present invention utilizes an outer conductive precious metal coating 12 uniformly applied to the exterior of refractory particles or spheres 14 as shown in FIG. 1.

Figure 2:
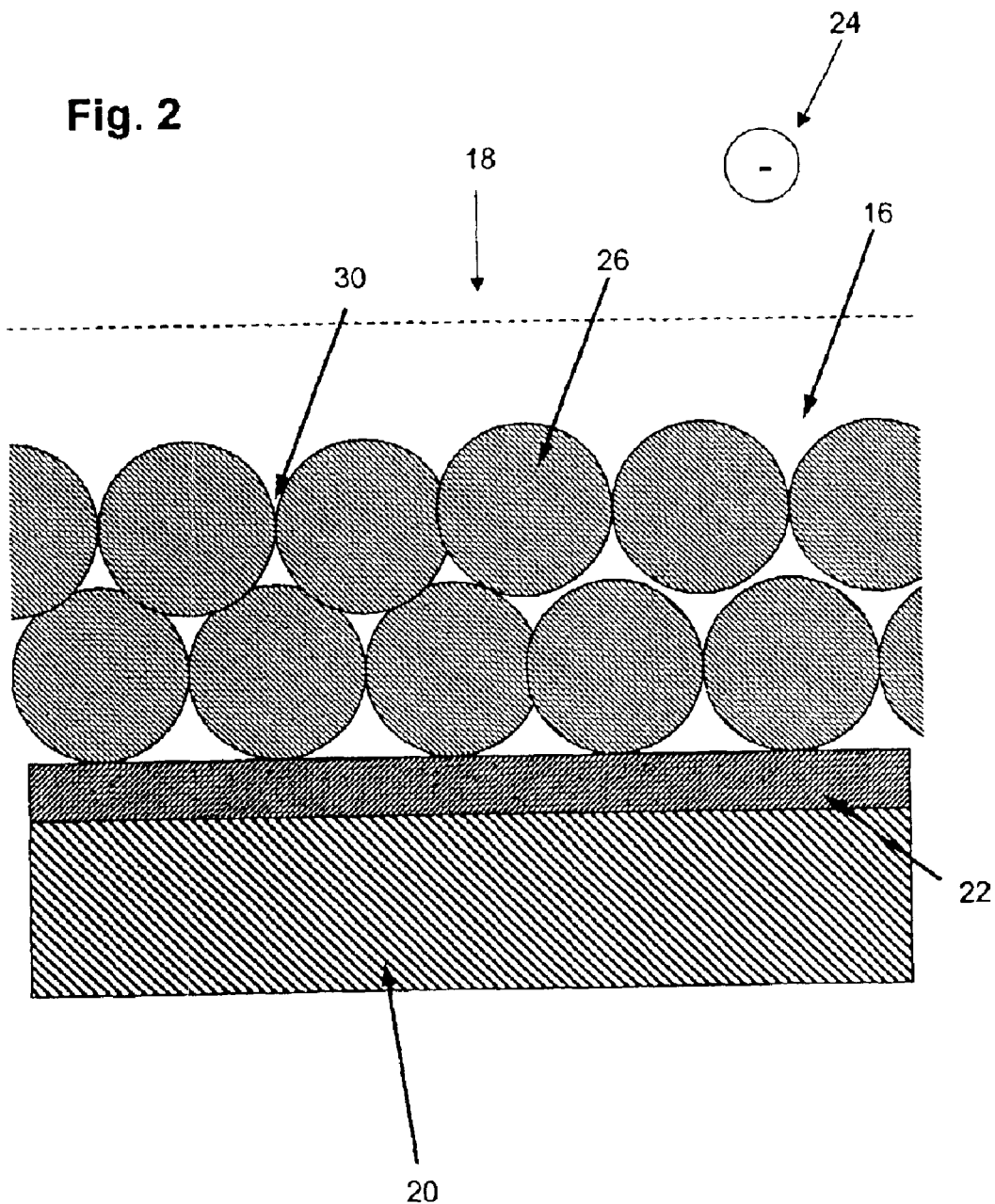
FIG. 2 is an elevational view of a simplified electrochemical device of the present invention.

Referring now to FIG. 2 the electrochemical device 18 for generating a desired gas of the type includes an ionically conductive electrolyte layer 20, a porous electrode layer 22, and the current collector layer 16 that has a high electrical conductivity and is porous to desired gas 24 generated by the electrochemical device 18. The current collector layer 16 is substantially formed as a film comprised of a layer of spherical refractory material objects 26 having a conductive coating 12 of a precious metal. The coated spherical objects 26 have a desired diameter 28 making them suitable for forming into the electrically conductive film.

The precious metal is from the aforementioned set of materials Ag, Au, Pt, Pd, and corresponding alloys. The refractory material typically is a ceramic, such as zirconia, alumina, or ceria, but could also be a perovskite or other conductive ceramic with a similar thermal expansion coefficient to oxygen conducting ceramics (that is zirconia and ceria).

Uniformity of the spheres 26 shown in FIG. 1 is important to maximizing the porosity of a layer formed from the coated spheres 26.

The coated spherical objects 26 generally have a uniform diameter that is selected to be appropriate for their formation in the film forming the current collector 16.

FIG. 2 shows a cross section of a typical electrochemical device 18 in which the bottom layer 20 is an ionically conductive electrolyte, the middle layer 22 is a porous electrode with high electrical conductivity and catalytic activity for the ion species transported by the electrolyte layer 20. The upper layer 16 is the porous current collector that preferably has a very high electrical conductivity. Silver (Ag) has the highest electrical conductivity for all known materials that can meet the current collector layer 16 operating requirements.

At the interface between the electrolyte and electrode layers 20 and 22, the primary function is to ensure the efficient transport of oxygen or other selected gas ions into and out of the electrolyte 20. While adhesion of the electrolyte and the electrode layers 20 and 22 is important, it is also important to maintain a high surface area for oxygen or other gas ions to be catalyzed.

In the present electrochemical electrode composition, the current collector layer 16 is formed from the conductive coated refractory particles 26 shown in FIG. 1. A desired permeability or porosity of the current collector layer 16 is about 50 percent. A continuous electrical path is formed through the current conductor layer due to the conductive coated refractory particles touching one another 30 or abutting against one another.

The electrical performance of the disclosed conductive coating is expected to be similar to a coating containing solid conductive spheres due to the fact that the charge distribution in a conductive sphere is concentrated at the perimeter of the sphere.

The foregoing disclosure and description of the invention are illustrative and explanatory thereof, and various changes in the size, shape and materials, as well as in the details of the illustrated construction may be made without departing from the spirit of the invention.

What is claimed is:

1. A current collector for an electrochemical device of the type that includes an ionically conductive electrolyte layer for gas generating, the invention comprising:

the current collector layer having a high electrical conductivity and being porous to desired gas generated by the electrochemical device; and, the current collector layer being substantially formed as a film comprised of a layer of spherical ceramic refractory material objects having a conductive cooling of a precious metal.

2. The invention of claim 1 wherein the precious metal is selected from the group consisting of silver, palladium, gold, or platinum, or alloys of these metals with other metals.

3. The invention of claim 1 wherein the refractory material is a metal oxide ceramic.

4. The invention of claim 1 wherein the refractory material is selected from the group consisting of zirconia, alumina, ceria, perovskite.

5. A metal coated element for forming a current collector for an electrochemical device of the type that includes an ionically conductive electrolyte layer for gas generating, the invention comprising;

spherical ceramic refractory material objects having a conductive coating of a precious metal; and the coated spherical objects having a diameter suitable for forming into a desired film;

whereby the coated spherical objects can be formed into a current conducting film.

6. The invention of claim 5 wherein the precious metal is selected from the group consisting of silver, palladium, gold, or platinum, or alloys of these metals with other metals.

7. The invention of claim 5 wherein the refractory material is a metal oxide ceramic.

8. The invention of claim 5 wherein the refractory material is selected from the group consisting of zirconia, alumina, ceria, or perovskite.

* * * * *